(12) United States Patent
Kuutela et al.

(10) Patent No.: US 10,727,911 B2
(45) Date of Patent: Jul. 28, 2020

(54) BEAMFORMING IN MIMO RADIO NETWORKS

(71) Applicant: Nokia Solutions and Networks Oy, Espoo (FI)

(72) Inventors: Topi Kuutela, Espoo (FI); Jussi Samuel Salmi, Haarajoki (FI); Niko Robert Vaisanen, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/542,406

(22) Filed: Aug. 16, 2019

(65) Prior Publication Data

US 2020/0059271 A1   Feb. 20, 2020

(30) Foreign Application Priority Data

Aug. 20, 2018   (FI) .................................... 20185688

(51) Int. Cl.
*H04B 7/0426* (2017.01)
*H04B 7/0417* (2017.01)
(Continued)

(52) U.S. Cl.
CPC .......... *H04B 7/043* (2013.01); *H04B 7/0421* (2013.01); *H04B 7/0465* (2013.01); *H04B 7/066* (2013.01)

(58) Field of Classification Search
CPC .... H04B 7/00; H04B 7/02; H04B 7/04–0447; H04B 7/0465; H04B 7/066
See application file for complete search history.

(56) References Cited

U.S. PATENT DOCUMENTS 6,134,261 A * 10/2000 Ryan .................... H04B 7/0619
  370/203
6,477,161 B1 * 11/2002 Hudson ................ H04B 7/0615
  370/281
(Continued)

FOREIGN PATENT DOCUMENTS

EP   3261277 A1   12/2017

OTHER PUBLICATIONS

Matsumoto, Tomoko, et al., "A Proposal of DPC Beamforming for Open Loop Multiuser MIMO Transmissions", IEEE International Conference on Communications (ICC), May 23, 2010, pp. 1-6.
(Continued)

*Primary Examiner* — James M Perez
(74) *Attorney, Agent, or Firm* — Harrington & Smith

(57) ABSTRACT

It is provided a method, including decomposing a channel matrix obtained from a reception channel from a sender to a reception antenna array into its singular vectors, wherein the singular vectors include left-singular vectors and right-singular vectors; allocating powers to the right-singular vectors to obtain power-allocated right-singular vectors; identifying maximum antenna gain directions based on a response function of the reception antenna array and all or a subset of the power-allocated right-singular vectors; calculating, for each of the maximum antenna gain directions or a subset thereof, a respective transmission beamforming vector based on a response function of a transmission antenna array; applying the transmission beamforming vectors or a subset thereof to a transmission via the transmission antenna array to the sender.

18 Claims, 2 Drawing Sheets

S10 — Decompose channel matrix of reception channel into singular vectors

S20 — Allocate powers to right-singular vectors

S30 — Identify maximum antenna gain directions based on response function and singular vectors S40 — Calculate beamforming vector for max. antenna gain directions, based on response function S50 — Apply at least subset of beamforming vectors to transmission

(51) Int. Cl.
*H04B 7/0456* (2017.01)
*H04B 7/06* (2006.01)

(56) References Cited

U.S. PATENT DOCUMENTS

| | | | | |
|---|---|---|---|---|
| 6,694,155 | B1* | 2/2004 | Chin | H04B 7/0615 455/561 |
| 6,760,388 | B2* | 7/2004 | Ketchum | H04B 7/0417 375/295 |
| 7,026,989 | B1* | 4/2006 | Minkoff | H01Q 3/36 342/372 |
| 7,944,891 | B2* | 5/2011 | Whinnett | H04B 7/0617 370/334 |
| 8,000,418 | B2* | 8/2011 | Jin | H01Q 3/2617 342/368 |
| 8,073,068 | B2* | 12/2011 | Kim | H04W 52/42 375/267 |
| 8,325,844 | B2* | 12/2012 | Walton | H04B 7/0417 375/130 |
| 8,451,944 | B2* | 5/2013 | Gaur | H04B 7/0426 375/296 |
| 8,457,265 | B2* | 6/2013 | Sampath | H04L 25/03006 375/232 |
| 8,989,291 | B2* | 3/2015 | Haustein | H04B 7/0617 375/267 |
| 9,042,276 | B1* | 5/2015 | Harel | H04J 3/1694 370/277 |
| 9,276,783 | B2* | 3/2016 | Tiirola | H04L 25/03343 |
| 9,544,171 | B2* | 1/2017 | Berardinelli | H04L 25/03343 |
| 2003/0139196 | A1* | 7/2003 | Medvedev | H04B 7/0443 455/522 |
| 2003/0161282 | A1* | 8/2003 | Medvedev | H04B 7/0417 370/329 |
| 2003/0185309 | A1* | 10/2003 | Pautler | H04B 7/0417 375/257 |
| 2003/0218973 | A1* | 11/2003 | Oprea | H04B 7/0434 370/210 |
| 2004/0102157 | A1* | 5/2004 | Lewis | H01Q 3/30 455/63.4 |
| 2004/0190636 | A1* | 9/2004 | Oprea | H04B 7/0417 375/260 |
| 2004/0192218 | A1* | 9/2004 | Oprea | H04L 25/03343 455/73 |
| 2004/0209579 | A1* | 10/2004 | Vaidyanathan | H04B 7/0615 455/101 |
| 2005/0237920 | A1* | 10/2005 | Howard | H04B 7/0413 370/208 |
| 2005/0249304 | A1* | 11/2005 | Takano | H04B 7/02 375/267 |
| 2006/0002496 | A1* | 1/2006 | Wallace | H04B 7/0417 375/347 |
| 2006/0013250 | A1* | 1/2006 | Howard | H04B 7/0417 370/465 |
| 2007/0036353 | A1* | 2/2007 | Reznik | H04B 7/0434 380/30 |
| 2007/0071147 | A1* | 3/2007 | Sampath | H04L 25/0204 375/347 |
| 2007/0115799 | A1* | 5/2007 | Ting | H04L 1/0026 370/208 |
| 2007/0149180 | A1* | 6/2007 | Lin | H04B 7/0617 455/415 |
| 2007/0149181 | A1* | 6/2007 | Lin | H04B 7/0641 455/415 |
| 2007/0191066 | A1* | 8/2007 | Khojastepour | H04B 7/0408 455/562.1 |
| 2007/0217538 | A1* | 9/2007 | Waxman | H04B 7/0417 375/267 |
| 2007/0249296 | A1* | 10/2007 | Howard | H04B 7/0421 455/101 |
| 2008/0014892 | A1* | 1/2008 | Aldana | H04B 7/0691 455/277.1 |
| 2008/0080449 | A1* | 4/2008 | Huang | H04B 7/0634 370/342 |
| 2008/0108310 | A1* | 5/2008 | Tong | H04B 7/0478 455/69 |
| 2008/0267098 | A1* | 10/2008 | Walton | H04B 7/0417 370/280 |
| 2008/0285670 | A1* | 11/2008 | Walton | H04L 27/2647 375/260 |
| 2009/0116569 | A1* | 5/2009 | Jin | H04B 7/0417 375/260 |
| 2009/0304103 | A1* | 12/2009 | Vaidyanathan | H04B 7/0443 375/267 |
| 2010/0091675 | A1* | 4/2010 | Sawai | H04B 7/063 370/252 |
| 2014/0126436 | A1* | 5/2014 | Safavi | H04B 7/063 370/295 |
| 2016/0043883 | A1* | 2/2016 | Zirwas | H04L 25/0204 370/329 |
| 2017/0235316 | A1* | 8/2017 | Shattil | G05D 1/104 701/3 |
| 2018/0368083 | A1* | 12/2018 | Yang | H04B 7/0486 |
| 2020/0052852 | A1* | 2/2020 | Vitthaladevuni | H04B 7/063 |

OTHER PUBLICATIONS

Koutalos, A.C., et al., "Effect of frequency division duplex on open loop downlink beamforming in WCDMA systems", Sep. 24-28, 2002, Proceedings IEEE 56th Vehicular Technology Conference, abstract only, 1 pg.

Matsumoto, T., et al., "A Proposal of DPC Beamforming for Open Loop Multiuser MIMO Transmissions", May 23-27, 2010, 2010 IEEE International Conference on Communications, abstract only, 1 pg.

* cited by examiner

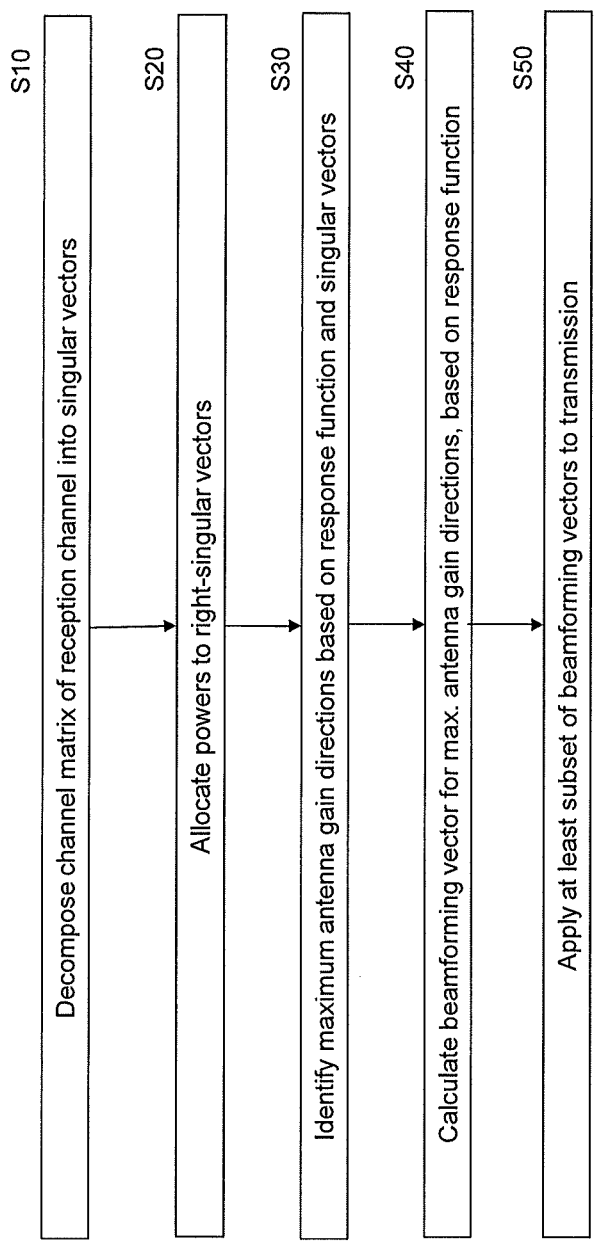

BEAMFORMING IN MIMO RADIO NETWORKS

FIELD OF THE INVENTION

The present invention relates to an apparatus, a method, and a computer program product related to beamforming in MIMO radio networks. It is particularly useful in case of a large frequency gap between uplink and downlink.

ABBREVIATIONS

2D/3D 2-dimensional/3-dimensional
3GPP $3^{rd}$ Generation Partnership Project
4G/5G $4_{th}/5^{th}$ Generation
CSI Channel State Information
DoA Direction of Arrival
EADF Effective Aperture Distribution Function
FDD Frequency Division Duplex
eNB evolved NodeB
gNB next generation NodeB
IEEE Institute of Electrical and Electronics Engineers
LTE Long Term Evolution
MIMO Multiple Input-Multiple Output
MUSIC Multiple Signal Classification
NR New Radio
OFDM Orthogonal Frequency Division Multiplex
RRH Remote Radio Head
TDD Time Division Duplex
UE User Equipment

BACKGROUND OF THE INVENTION

The term radio propagation channel is commonly used in literature to characterize the complete radio transmission system from the transmitter to the receiver. Some relevant factors influencing the radio channel are the effects of (multipath) propagation, the antenna arrays and the rest of the radio equipment.

A MIMO radio channel can be compactly expressed using the notion of channel matrix:

$$y = Hx + n \quad (1)$$

where y is the received signal, x is the transmitted signal, H is the channel matrix and n is Gaussian noise. The interference caused by other users in the same frequency band is often included in the noise. The channel matrix describes the amplitude and phase change over the whole propagation channel between a pair of transmitter and receiver antennas (antenna arrays made of antenna elements). Each element of the matrix comprises the superposition of individual propagation paths, and the effects of corresponding antenna elements and other radio equipment.

In real-world situations, the channel matrix also includes, for example, the coupling between antenna elements. However, without further a priori information it does not allow separation of different aspects of the propagation.

In modern digital radio communications, the protocols often require knowledge about the channel matrix, or some parameters of it, and therefore it is usually measured. The measurement of the channel matrix is called channel estimation. Typically, and especially in mobile networks, channel estimation is based on reference symbols. Reference symbols are data symbols whose values, transmit times and frequencies are known in advance by the receiver. The simplest method for channel estimation is then to construct a least squares problem out of these symbols. The channel estimate is usually called Channel State Information (CSI).

Relevant Prior Art is

T. Matsumoto, N. Miyazaki, S. Konishi: A Proposal of DPC Beamforming for Open Loop Multiuser MIMO Transmissions, 2010 *IEEE International Conference on Communications*, Cape Town, 2010, pp. 1-6

A. C. Koutalos, J. S. Thompson: Effect of frequency division duplex on open loop downlink beamforming in WCDMA systems, in Proceedings *IEEE 56th Vehicular Technology Conference*, vol. 2, pp. 686-690 vol. 2, 2002.

U.S. Pat. No. 7,944,891 B2.

SUMMARY OF THE INVENTION

It is an object of the present invention to improve the prior art.

According to a first aspect of the invention, there is provided an apparatus, comprising means for decomposing configured to decompose a channel matrix obtained from a reception channel from a sender to a reception antenna array into its singular vectors, wherein the singular vectors include left-singular vectors and right-singular vectors; means for allocating configured to allocate powers to the right-singular vectors to obtain power-allocated right-singular vectors; means for identifying configured to identify maximum antenna gain directions based on a response function of the reception antenna array and all or a subset of the power-allocated right-singular vectors; means for calculating configured to calculate, for each of the maximum antenna gain directions or a subset thereof, a respective transmission beamforming vector based on a response function of a transmission antenna array; means for applying configured to apply the transmission beamforming vectors or a subset thereof to a transmission via the transmission antenna array to the sender.

According to a second aspect of the invention, there is provided an apparatus, comprising means for decomposing configured to decompose a channel matrix obtained from a reception channel from a sender to a reception antenna array into its singular vectors, wherein the singular vectors include normalized left-singular vectors and normalized right-singular vectors; means for identifying configured to identify maximum antenna gain directions based on a response function of the reception antenna array and the normalized right-singular vectors; means for calculating configured to calculate, for each of the maximum antenna gain directions or a subset thereof, a respective transmission beamforming vector based on a response function of a transmission antenna array; means for allocating configured to allocate powers to the transmission beamforming vectors to obtain power-allocated transmission beamforming vectors; means for applying configured to apply the power-allocated transmission beamforming vectors or a subset thereof to a transmission via the transmission antenna array to the sender.

For each of the first and second aspects of the invention:
The means for calculating may be configured such that the calculating of the transmission beamforming vectors comprises reducing side lobes of at least a subset of the transmission beamforming vectors. In particular, the side lobes may be reduced by tapering.

The means for calculating may be configured such that the calculating of the transmission beamforming vectors comprises orthogonalizing the beamforming vectors.

The means for allocating may be configured to allocate the powers by a waterfilling algorithm.

The means for allocating may be configured to prune power-allocated vectors to which less power than a predetermined power threshold is allocated.

The reception antenna array may be the same as the transmission antenna array.

According to a third aspect of the invention, there is provided a method, comprising decomposing a channel matrix obtained from a reception channel from a sender to a reception antenna array into its singular vectors, wherein the singular vectors include left-singular vectors and right-singular vectors; allocating powers to the right-singular vectors to obtain power-allocated right-singular vectors; identifying maximum antenna gain directions based on a response function of the reception antenna array and all or a subset of the power-allocated right-singular vectors; calculating, for each of the maximum antenna gain directions or a subset thereof, a respective transmission beamforming vector based on a response function of a transmission antenna array; applying the transmission beamforming vectors or a subset thereof to a transmission via the transmission antenna array to the sender.

According to a fourth aspect of the invention, there is provided a method, comprising decomposing a channel matrix obtained from a reception channel from a sender to a reception antenna array into its singular vectors, wherein the singular vectors include normalized left-singular vectors and normalized right-singular vectors; identifying maximum antenna gain directions based on a response function of the reception antenna array and the normalized right-singular vectors; calculating, for each of the maximum antenna gain directions, a respective transmission beamforming vector based on a response function of a transmission antenna array; allocating powers to the transmission beamforming vectors to obtain power-allocated transmission beamforming vectors; applying the power-allocated transmission beamforming vectors or a subset thereof to a transmission via the transmission antenna array to the sender.

For each of the third and fourth aspects:

The calculating of the transmission beamforming vectors may comprise reducing side lobes of at least a subset of the transmission beamforming vectors. In particular, the side lobes may be reduced by tapering.

The calculating of the transmission beamforming vectors may comprise orthogonalizing the beamforming vectors.

The powers may be allocated by a waterfilling algorithm.

The allocating may comprise pruning power-allocated vectors to which less power than a predetermined power threshold is allocated.

The reception antenna array may be the same as the transmission antenna array.

Each of the methods of the third and fourth aspects may be a method of beamforming.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:

Higher channel capacity;

No need for CSI feedback from receiver;

Number of simultaneous users (receivers) may be increased.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 1 shows an apparatus according to an example embodiment of the invention;

FIG. 2 shows a method according to an example embodiment of the invention;

DETAILED DESCRIPTION OF CERTAIN EMBODIMENTS

Figure 4:
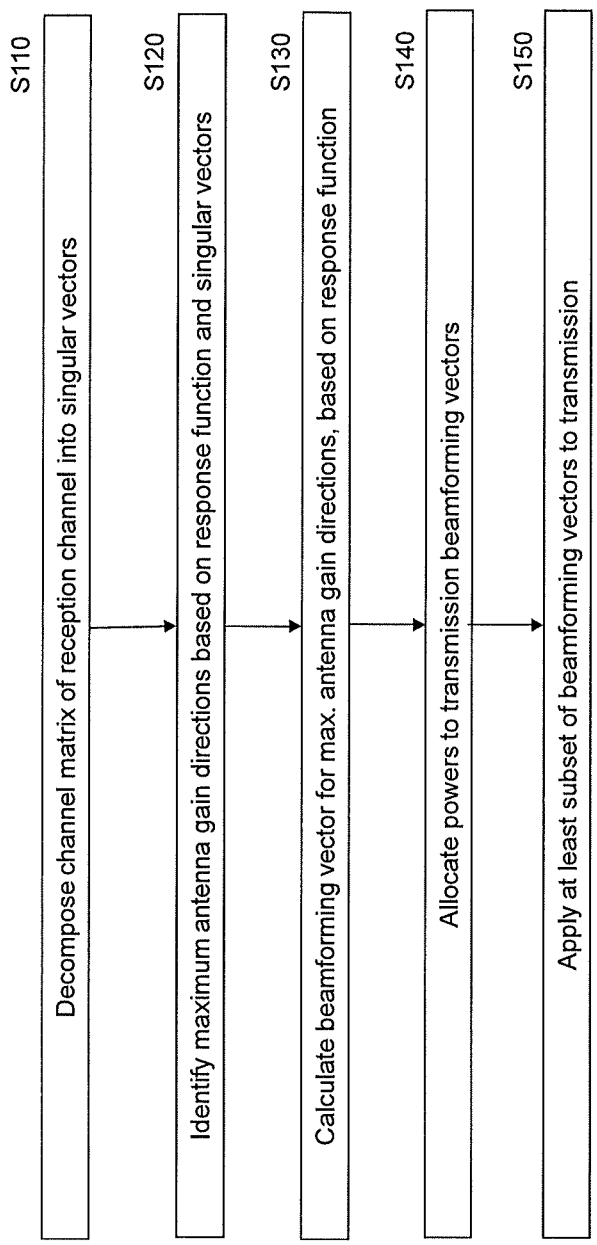
FIG. 4 shows a method according to an example embodiment of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The propagation paths are generally reciprocal, that is, the same propagation paths can be used in either direction. However, although the propagations paths may be the same, in frequency division duplex systems the channel matrices can differ significantly, in particular if the difference between reception frequency (e.g. uplink frequency in case of a base station (eNB, gNB)) and transmission frequency (e.g. downlink in case of the base station) is large. In high bandwidth TDD systems, the frequency gap between the center frequency and end frequencies may be large, too.

For example, in LTE, the FDD duplex spacing (frequency gap between the up- and downlink bands) varies between 10 and 400 MHz. The relative spacing is between 2% and 20%. Conversely, this means that the spacing between antenna elements in an antenna array relative to the signal wavelength can vary up to 20% between uplink and downlink.

A channel is considered narrowband if it is sufficiently narrow that its frequency response is close to constant over the whole transmission frequency band. This is usually the case if the carrier frequency is orders of magnitude higher than the bandwidth. As the carrier frequency is significantly higher than the bandwidth, the LTE example case can be analyzed using narrowband models. However, as the relative frequency gap can be quite significant, the up- and downlink directions can only be considered narrowband separately. As a consequence, beamforming methods which employ only the uplink channel matrix produce incorrect beamforming weights for downlink beamforming and vice versa.

Although beamforming is more tolerant to channel estimate errors than e.g. decoding, the gap between up- and downlink frequencies may be too wide in LTE. This is due to the fact that beamforming is based on adjusting the phase and amplitude of the signal in specific way at the different antennas. However, the antenna array has different electrical distance of the antenna elements in FDD for uplink and for downlink, i.e. the antenna spacing measured in wavelengths is different at different carrier frequencies. This means that beamforming coefficients estimated from uplink will provide erroneous phasing in downlink.

The channel (matrix) estimate is generally derived out of pilot symbols which are received amongst the received data. Therefore, it is only possible to estimate correctly the uplink channel at the base station, and the downlink channel at the user equipment.

As beamforming in downlink is done by the base station, and the transmitted downlink signal is affected by the downlink channel, a method to construct good beamforming vectors for downlink using only the available information (in particular: the uplink channel matrix) is desired. Some embodiments of the invention provide such a method and an apparatus to perform such a method.

According to some embodiments of the invention, the downlink beamforming vectors are constructed by manipulating the eigen-space constructed from the uplink eigen-beamformed weight vectors and antenna array response measurements. The maximum gain direction of each uplink eigen-beam is searched for, based on uplink-frequency antenna array measurement. Then, using downlink-frequency antenna array response measurement, the downlink beamforming vector is constructed by selecting phases and amplitudes for each antenna element that maximize the gain in the maximum gain direction. Finally, the vectors are (optionally) tapered and orthogonalized.

The antenna response function is defined as $b(\phi, \theta)$, where $b: R^2 \rightarrow C^M$, with M being the number of antenna elements. Each element of $b(\phi, \theta)$ contains then the complex antenna response at a single of one antenna element, at the 2D direction defined by azimuth $\phi$ and elevation $\theta$. Several options for the definition of this function exist, such as interpolation of antenna response manifold, or the Effective aperture distribution function (EADF). Up- and downlink antenna response functions are separately defined as $b^{up}(\phi, \theta)$ and $b^{down}(\phi, \theta)$, respectively, as antenna response functions defined for the reception antenna array at the uplink frequency and for the transmission antenna array at the downlink frequency.

The method according to some embodiments of the invention may comprise the following steps:
1. Compute the singular value decomposition of the uplink channel matrix
2. Allocating a respective power to the right singular vectors obtained from 1 preferably such that data throughput is maximized for one user. Preferably, a waterfilling algorithm is used. Optionally, right singular vectors representing beams with no power (or less power than a predetermined threshold) may be pruned.
3. Find the maximum antenna gain directions corresponding to the right singular vectors obtained from step 2; this step may be performed for all of the right singular vectors obtained from step 2 or a subset of these vectors.
4. For each of the maximum gain directions or a subset thereof, calculate the downlink beamforming vector from downlink antenna response function
5. (optional) (amplitude) taper the downlink beamforming vector for each maximum gain direction or a subset of the maximum gain directions;
6. (optional) Orthogonalize the downlink beamforming vectors The principle behind this approach is as follows: In many cases, the eigenbeams are strong in only one direction. In a smaller number of cases the eigenbeams have a wider lobe, or a pattern comprising multiple lobes. Although the wide beams are optimal for the user they are generated for, they are also significant interference sources. If single-user MIMO is employed, the eigen-beams are also orthogonal by construction.

In both cases it is intuitive that the strongest signal is towards a (set of) strong propagation paths between the transmitter and the receiver. Therefore it is attractive to attempt to construct a beam that is more narrow than the eigenbeam, but also uses the propagation path indicated by the eigenbeam.

The propagation paths are (nearly) frequency independent. Therefore, the geometrical paths should be equally good in both up- and downlink. Intuitively, we may search for the main directions employed by uplink eigen-beam-forming, and then use those directions for downlink beamforming. With the downlink antenna model we can then construct a downlink beamforming vector for each of the main directions. This also overcomes the problematic frequency conversion between uplink and downlink channels!

The steps 1 and 2 are defined in the same way as in the well-known eigen-beamforming method. The beamforming vectors are taken as the right singular vectors of the channel matrix, obtained e.g. from the uplink pilot symbols.

For step 2, a waterfiling algorithm may be used. Waterfilling is a well-known method which achieves optimal power allocation for a single user. When the channel matrix is singular value decomposed in step 1, the singular values (along with the current channel noise level and the total power capacity of the transmitter) determine the optimal power assignment per beam. The singular vector associated with the largest singular value gets assigned the most power, and the singular vectors corresponding to smaller singular values subsequently less power. That is, the singular vector with the largest singular value corresponds to the best transmission path, and thus gets assigned the most transmission power. The other beams get assigned less power, even as little as no power at all. Note that the beam associated with largest power allocation (and thus largest singular value) also transmits the most data. This whole process is called waterfilling, and it is a single, indivisible, process.

The information on the allocated powers is also very useful (albeit not indispensable) for user scheduling.

It is not necessary to do waterfilling at this stage. For example, in step 2, power can be divided equally between all beams. While such a power allocation reduces computational complexity of step 2, it is suboptimal from several perspectives: lower data throughput, less simultaneous users (as each user occupies more beams), higher computational complexity of the subsequent steps.

Note that the power allocation made at this stage is not the power allocation of the transmitted beams! At this stage, only the beams of a single user are considered, while in the complete system multiple users are simultaneously served. In some embodiments, the user scheduler may choose just a subset of the beams constructed for one user. Then, the power should be re-allocated per beam, also taking into account the power budget for other users.

If (optional) pruning is done at this stage (i.e. after waterfilling), the maximum gain direction search can be skipped for them. This naturally decreases computational complexity.

The step 3 is defined as a maximization problem for each eigen-beamforming vector or a subset thereof. The problem can be formulated as arg max $|w^T b^{up}(\phi, \theta)|$, where the maximization is made over $\phi$ and $\theta$, and w is the weight vector constructed via eigen-beamforming with power allocation and preferably after pruning. Denote the $\phi$ and $\theta$ which maximize this as $\phi^1$ and $\theta^1$ The implementation of step 3 depends on the choice of antenna model. For example, the antenna model may be based on measurements. Preferably, it is measured in an anechoic chamber, at the respective frequency. However, such a model is inherently discontinuous because the measurement may be performed at discrete directions and with discrete frequencies only. Thus, in some embodiments, the measured data are interpolated to obtain a smooth antenna model. Also, the antenna model may be restricted to a certain sector such as 60° in the azimuth.

As another example of an antenna model, Effective Aperture Distribution Function (EADF) may be used. It is a formulation of the complex antenna gain pattern based on the two-dimensional Fourier expansion of a measured gain pattern. The Fourier expansion may then be clamped, introducing a kind of a low pass filtering. In a modification of EADF, a fast phase shift as the complex gain is measured around the antenna may be compensated for before applying the "pure" EADF algorithm.

The step 4 can be calculated as:

$$w_{down} = \frac{|r_{down}|}{\|r_{down}\|} e^{-j arg(r_{down})},$$

where $r_{down} = b^{down}(\phi^1, \theta^1)$. The absolute value and argument are taken elementwise, and the norm (denoted as $\|.\|$) is Euclidean norm. The indices "up" and "down" refer to "uplink" (reception) and "downlink" (transmission), respectively.

The beams calculated by step 4 may have strong sidelobes. As sidelobes are not directed towards the intended recipient, they amount to generating interference to other users. The radio network performance measure is decreased by interference, and therefore it is attractive to consider methods to decrease the side lobe powers.

For example, in order to reduce the sidelobes of a beam-formed radiation pattern, amplitude tapering can be employed. In amplitude tapering the central antenna elements are excited more than the elements on the sides. However, in addition to decreasing side lobes, amplitude tapering also widens the main beam and reduces the signal level in the desired direction. The effect is similar to windowing in Fourier analysis.

Therefore, in optional step 5, tapering weights may be multiplied to the weight vector $w_{down}$ elementwise. The tapering weights are antenna array and tapering method dependent.

Finally, at optional step 6 the transformed beamforming weight vectors may be orthogonalized using e.g. the Gram-Schmidt method. The orthogonalization can be done in the usual Euclidean vector space. The beamforming vectors of a single user are generally non-orthogonal after the previous step, and therefore they cause interference to each other. Interference is reduced by the orthogonalization. As an alternative to the Gram-Schmidt method, one may construct an optimization problem to orthogonalize the vectors.

The choice of antenna response function defines restrictions on the implementations. For example, with simple stored antenna array manifold, the resolution of search space in step 3 can be hierarchically expanded, first searching for general direction of maximum gain on lower resolution, and then focusing more accurate search on the strongest candidate directions. Alternatively or simultaneously, especially with large antenna arrays, a form of tapering can be used to ease the search. The central elements or any other subset of adjacent antenna elements of an antenna array can be used for the initial search, and the complete array response may be used to refine the directions found with the central elements.

It is noted that this method is not explicitly based on search for the strongest propagation directions, and therefore e.g. MUSIC is not applicable. Instead, due to the eigen-beamforming, it is searched only for directions that are separable by the receiver, i.e. directions that correspond to (a part of) orthogonal channel components. Therefore, this method is better suited to MIMO transmissions than DoA estimations without eigen-beamforming. Namely, several of the DoA directions sometimes correspond to a single eigen-beam. Such directions are not well separable for different users if beams were assigned to them.

We verified the method in simulations against uplink- and downlink eigen-beamforming and found that this method is capable of closing the gap between them partially. With several different scenarios, with 7% relative frequency gap between up- and downlink, the single-user channel capacity improved approximately 1.5-7%, compared to direct eigen-beamforming on the uplink channel. With larger frequency gap of 14%, we found improvement of up to 10%.

The method does not need extra Channel State Information feedback from the receiver (UE in case of downlink). As the pilot symbols for uplink channel estimation are transmitted anyways to allow the base station to correctly interpret received uplink data, the user equipment does not need to send information specifically for downlink channel estimation, beyond the rank of the transmissions.

Finally, if multi-user scheduling is used, the beams formed using this method are narrow enough to allow a higher number of simultaneous beams than conventionaly eigen-beamforming. According to our simulations, with a 8-by-4-by-2 (horizontal, vertical, polarization) rectangular antenna array, we were able to include on average 4 beams with conventional eigen-beamforming, and slightly over 5 beams with a method according to some embodiments of the invention.

A main difference to U.S. Pat. No. 7,944,891 B2 is the use of antenna array response measurements. Some embodiments of the invention may be deployed to 2D (3D in Nokia terminology) beamforming. Furthermore, U.S. Pat. No. 7,944,891 B2 only corrects for phase, while some embodiments of this invention may select optimal amplitudes, too. Some embodiments of the invention do not require separate manifold calibration as in U.S. Pat. No. 7,944,891 B2 because the antenna response measurement is directly used.

In some embodiments of the invention, step 2 (waterfilling and optional pruning) may be omitted between steps 1 and 3. In this case, steps 3 and 4 of the method described above are performed based on the normalized ($l^2$-norm=1)

right single vectors. Power allocation is than performed after step 4. That is, in these embodiments, the following steps are performed:
1. Compute the singular value decomposition of the uplink channel matrix. The singular vectors obtained from the singular value decomposition are typically normalized. If they are not normalized, a normalization step may follow after the singular value decomposition.
2. Find the maximum antenna gain directions corresponding to the normalized right singular vectors obtained from step 2.
3. For each maximum gain direction or a subset thereof, calculate the downlink beamforming vector from downlink antenna response function,
4. Allocating a respective power to the downlink beamforming vectors obtained from step 3, preferably such that data throughput is maximized for one user. Preferably, a waterfilling algorithm is used. Optionally, downlink beamforming vectors representing beams with no power (or less power than a predetermined threshold) may be pruned.
5. (optional) (amplitude) taper the downlink beamforming vector for each maximum gain direction or a subset thereof;
6. (optional) Orthogonalize the downlink beamforming vectors If step 5 and/or step 6 is (are) performed, step 4 and the performed one(s) of steps 5 and 6 may be performed in an arbitrary sequence, wherein each subsequent step uses the beamforming vector obtained from the previous step as its input.

Some embodiments of the invention are described where one antenna array is used for both receiving and transmitting. However, embodiments of the invention are not limited to one antenna array. Different antenna arrays may be used for receiving and transmitting.

In this case, the receive antenna array and the transmit antenna array should be co-located. For example, the two antenna arrays may be interleaved antenna arrays, e.g. a rectangular array where every other element is for reception and transmission, respectively. Furthermore, since the users are typically far, antenna arrays positioned next to each other also work. The maximum distance between the antenna arrays depends on the array geometry, frequencies used and the distance between user equipment and base station.

It is also possible to compensate for the position difference using EADF for large antenna arrays. This method compensates for the shift between the antenna arrays.

If different antenna arrays are used for reception and transmission, different antenna response functions are used:
For the maximum gain direction search (step 3 in the method first mentioned, step 2 in the method second mentioned hereinabove): the antenna response function of the reception antenna array.
For the transmission beamforming vector construction (step 4 in the method first mentioned, step 3 in the method second mentioned hereinabove): the antenna response function of the transmission antenna array.

FIG. 1 shows an apparatus according to an embodiment of the invention. The apparatus may be a beamformer or an element thereof. FIG. 2 shows a method according to an embodiment of the invention. The apparatus according to FIG. 1 may perform the method of FIG. 2 but is not limited to this method. The method of FIG. 2 may be performed by the apparatus of FIG. 1 but is not limited to being performed by this apparatus.

The apparatus comprises means for decomposing 10, means for allocating 20, means for identifying 30, means for calculating 40, and means for applying 50. The means for decomposing 10, means for allocating 20, means for identifying 30, means for calculating 40, and means for applying 50 may be a decomposing means, allocating means, identifying means, calculating means, and applying means, respectively. The means for decomposing 10, means for allocating 20, means for identifying 30, means for calculating 40, and means for applying 50 may be a decomposer, allocator, identifier, calculator, and applier, respectively. The means for decomposing 10, means for allocating 20, means for identifying 30, means for calculating 40, and means for applying 50 may be a decomposing processor, allocating processor, identifying processor, calculating processor, and applying processor, respectively.

The means for decomposing 10 decomposes a channel matrix into its singular vectors (S10). The channel matrix is obtained from a reception channel from a sender to a reception antenna array. The singular vectors include left-singular vectors and right-singular vectors.

The means for allocating 20 allocates powers to the right-singular vectors to obtain power-allocated right-singular vectors (S20). I.e., a respective power is allocated to each of the right-singular vectors.

The means for identifying 30 identifies maximum antenna gain directions based on a response function of the reception antenna array and all or a subset of the power-allocated right-singular vectors (S30).

The means for calculating 40 calculates, for each of the maximum antenna gain directions or a subset thereof, a respective transmission beamforming vector (S40). The calculation is based on a response function of a transmission antenna array.

The means for applying 50 applies the transmission beamforming vectors or a subset thereof to a transmission via the transmission antenna array to the sender (S50).

Figure 3:
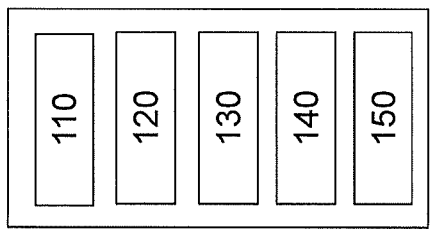
FIG. 3 shows an apparatus according to an example embodiment of the invention.

FIG. 3 shows an apparatus according to an embodiment of the invention. The apparatus may be a beamformer or an element thereof. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises means for decomposing 110, means for allocating 140, means for identifying 120, means for calculating 130, and means for applying 150. The means for decomposing 110, means for allocating 140, means for identifying 120, means for calculating 130, and means for applying 150 may be a decomposing means, allocating means, identifying means, calculating means, and applying means, respectively. The means for decomposing 110, means for allocating 140, means for identifying 120, means for calculating 130, and means for applying 150 may be a decomposer, allocator, identifier, calculator, and applier, respectively. The means for decomposing 110, means for allocating 140, means for identifying 120, means for calculating 130, and means for applying 150 may be a decomposing processor, allocating processor, identifying processor, calculating processor, and applying processor, respectively.

The means for decomposing 110 decomposes a channel matrix into its singular vectors (S110). The channel matrix is obtained from a reception channel from a sender to a reception antenna array. The singular vectors include normalized left-singular vectors and normalized right-singular vectors. I.e., if the decomposing does not generate normalized left-singular vectors and normalized right-singular vectors, the means for decomposing 110 normalizes at least the right-singular vectors obtained from the decomposing.

The means for identifying 120 identifies maximum antenna gain directions based on a response function of the reception antenna array and the normalized right-singular vectors (S120).

The means for calculating 130 calculates, for each of the maximum antenna gain directions or a subset thereof, a respective transmission beamforming vector based on a response function of a transmission antenna array (S130).

The means for allocating 140 allocates powers to the transmission beamforming vectors to obtain power-allocated transmission beamforming vectors (S140). I.e., a respective power is allocated to each of the beamforming vectors.

The means for applying 150 applies the power-allocated transmission beamforming vectors or a subset thereof to a transmission via the transmission antenna array to the sender (S150).

Figure 5:
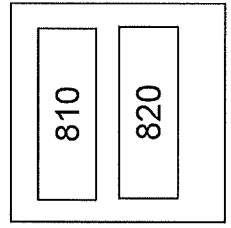
FIG. 5 shows an apparatus according to an example embodiment of the invention.

FIG. 5 shows an apparatus according to an example embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 2 and 4.

Some embodiments of the invention are described which are based on E-UTRAN. However, the invention is not limited to E-UTRAN and may be applied to UTRAN or other radio access technologies. They may include forthcoming radio access technologies such as NR but also non-3GPP radio (access) technologies such as WiFi. In NR, a gNB corresponds to a eNB of E-UTRAN.

The base station may be connected to the antenna array by a Remote Radio Head. Some embodiments of the invention may be deployed in the RRH.

Embodiments of the invention are particularly useful if there is a large difference between uplink frequency and downlink frequency. However, some embodiments may be applied even if there is just a small difference between uplink frequency and downlink frequency.

Embodiments of the invention are described for downlink beamforming at the base station based on the uplink channel matrix. However, in some embodiments, the concept may be applied to uplink beamforming at the terminal (UE) based on the downlink channel matrix. In general, embodiments of the invention may be applied to transmission beam forming based on reception channel matrix.

The number of antenna elements is not limited. The antenna may comprise two or more antenna elements which are separately controllable. The shapes of the antenna elements and its mutual arrangement are not limited. In particular, the antenna elements may be arranged in one plane or in plural planes. The antenna elements may be directed parallel to each other or may be directed into different directions.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a beamformer (e.g. of a gNB or eNB, or of a UE), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising
at least one non-transitory memory including computer program code;
at least one processor, wherein the at least one memory and the computer program code are arranged, when executed by the at least one processor, to cause the apparatus to be configured for:
decomposing a channel matrix obtained from a reception channel from a sender to a reception antenna array into its singular vectors, wherein the singular vectors include left-singular vectors and right-singular vectors;
allocating powers to the right-singular vectors to obtain power-allocated right-singular vectors;
identifying maximum antenna gain directions based on a response function of the reception antenna array and all or a subset of the power-allocated right-singular vectors;
calculating, for each of the maximum antenna gain directions or a subset thereof, a respective transmission beamforming vector based on a response function of a transmission antenna array; and
applying the transmission beamforming vectors or a subset thereof to a transmission signal via the transmission antenna array to the sender.

2. The apparatus according to claim 1, wherein the calculating is configured such that the calculating of the transmission beamforming vectors comprises reducing side lobes of at least a subset of the transmission beamforming vectors.

3. The apparatus according to claim 2, wherein the side lobes are reduced by tapering.

4. The apparatus according to claim 1, wherein the calculating is configured such that the calculating of the transmission beamforming vectors comprises orthogonalizing the beamforming vectors.

5. The apparatus according to claim 1, wherein
the allocating is configured to allocate the powers by a waterfilling algorithm.

6. The apparatus according to claim 1, wherein
the allocating is configured to prune power-allocated vectors to which less power than a predetermined power threshold is allocated.

7. The apparatus according to claim 1, wherein the reception antenna array is a same as the transmission antenna array.

8. An apparatus, comprising
at least one non-transitory memory including computer program code;
at least one processor, wherein the at least one memory and the computer program code are arranged, when executed by the at least one processor, to cause the apparatus to be configured for:
decomposing a channel matrix obtained from a reception channel from a sender to a reception antenna array into its singular vectors, wherein the singular vectors include normalized left-singular vectors and normalized right-singular vectors;
identifying maximum antenna gain directions based on a response function of the reception antenna array and the normalized right-singular vectors;
calculating, for each of the maximum antenna gain directions or a subset thereof, a respective transmission beamforming vector based on a response function of a transmission antenna array;
allocating powers to the transmission beamforming vectors to obtain power-allocated transmission beamforming vectors;
applying the power-allocated transmission beamforming vectors or a subset thereof to a transmission signal via the transmission antenna array to the sender.

9. Method, comprising
decomposing a channel matrix obtained from a reception channel from a sender to a reception antenna array into its singular vectors, wherein the singular vectors include left-singular vectors and right-singular vectors;
allocating powers to the right-singular vectors to obtain power-allocated right-singular vectors;
identifying maximum antenna gain directions based on a response function of the reception antenna array and all or a subset of the power-allocated right-singular vectors;
calculating, for each of the maximum antenna gain directions or a subset thereof, a respective transmission beamforming vector based on a response function of a transmission antenna array;
applying the transmission beamforming vectors or a subset thereof to a transmission signal via the transmission antenna array to the sender.

10. A computer program product comprising a non-transitory computer readable medium having a set of instructions which, when executed by an apparatus, is configured to cause the apparatus to carry out the method according to claim 9.

11. Method, comprising
decomposing a channel matrix obtained from a reception channel from a sender to a reception antenna array into its singular vectors, wherein the singular vectors include normalized left-singular vectors and normalized right-singular vectors;
identifying maximum antenna gain directions based on a response function of the reception antenna array and the normalized right-singular vectors;
calculating, for each of the maximum antenna gain directions, a respective transmission beamforming vector based on a response function of a transmission antenna array;
allocating powers to the transmission beamforming vectors to obtain power-allocated transmission beamforming vectors;
applying the power-allocated transmission beamforming vectors or a subset thereof to a transmission signal via the transmission antenna array to the sender.

12. The method according to claim 11, wherein the calculating of the transmission beamforming vectors comprises reducing side lobes of at least a subset of the transmission beamforming vectors.

13. The method according to claim 12, wherein the side lobes are reduced by tapering.

14. The method according to claim 11, wherein the calculating of the transmission beamforming vectors comprises orthogonalizing the beamforming vectors.

15. The method according to claim 11, wherein
the powers are allocated by a waterfilling algorithm.

16. The method according to claim 11, wherein
the allocating comprises pruning power-allocated vectors to which less power than a predetermined power threshold is allocated.

17. The method according to claim 11, wherein the reception antenna array is the same as the transmission antenna array.

18. A computer program product comprising a non-transitory computer readable medium having a set of instructions which, when executed by an apparatus, is configured to cause the apparatus to carry out the method according to claim 11.

* * * * *